March 22, 1960 R. P. HAMMOND ET AL 2,929,767
CONVECTION REACTOR
Filed June 6, 1956 3 Sheets-Sheet 1

WITNESSES:
Ralph Carlisle Smith
A. Fredrick Hamann

INVENTOR.
R. Philip Hammond
L.D. Percival King
By Roland A. Anderson

United States Patent Office 2,929,767
Patented Mar. 22, 1960

2,929,767
CONVECTION REACTOR

R. Philip Hammond and L. D. Percival King, Los Alamos, N. Mex., assignors to the United States of America as represented by the United States Atomic Energy Commission Application June 6, 1956, Serial No. 589,836

2 Claims. (Cl. 204—193.2)

The present invention relates to nuclear reactors and more particularly to homogeneous nuclear reactors utilizing a liquid fuel.

The nuclear reactor of the present invention is an improved reactor of the homogeneous type and is described as particularly suitable for use in the production of power where a compact, simple, reliable, portable reactor, capable of safe unattended operation, is required.

Homogeneous reactors of the prior art generally require extensive control and monitoring facilities, thereby necessitating the presence of an operator at all times. The reactor of the present invention utilizes convection circulation and thereby eliminates complicated circulating apparatus which must be constantly monitored for liquid fuel leaks and which requires constant mechanical surveillance. Further, the present invention uses an internal heat exchanger which is not located in the critical region, but which is located in the same pressure vessel as the critical region. Thus there is no necessity for handling the hot liquid fuel outside of the reactor pressure vessel during normal operation. The liquid fuel which is utilized in the reactor of the present invention eliminates the necessity for extensive radiolytic gas recombination apparatus. It is also the advantage of this reactor that no control rods are required. The reactor of the present invention also, without any movable mechanical apparatus, automatically regulates itself to the condition of criticality during moderate variations in temperature and pressure and shuts itself down if the pressure exceeds a predetermined safe operating value. These enumerated factors result in a reactor which is materially simplified not only with respect to the number of components required but also the complexity of the type. The use of homogeneous reactors in power producing facilities has well known advantages, i.e., simplified control and the ease in recovery of spent fuel.

Although the description of the preferred embodiment is specific to a power level of 1 megawatt, at which the central thermal neutron flux would be about $0.5 \times 10^{13}$ neutrons per sq. cm. per sec., the reactor is capable, by appropriate modifications, of operating in the higher megawatt region. The present invention provides for the removal of heat from the critical region by a convection system which moves the liquid fuel up a tube and returns it through the surrounding annulus which contains the heat exchanging apparatus. The fact that the liquid-gas interface is not in the critical region means that disturbances of the liquid surface will have a reduced effect upon the power and neutron level. The reactor can be primarily controlled by its negative temperature coefficient of reactivity and the power level can be controlled by regulating the flow of cooling fluid through the heat exchanger apparatus.

Therefore it is an object of the present invention to provide a homogeneous nuclear reactor which is relatively inexpensive to build, small in size, compact in arrangement and which will reliably operate without an operator in constant attendance.

Another object of the present invention is to provide a homogeneous nuclear reactor which is of such size and simplicity that it may be readily transported to remote locations.

A further object of the present invention is to provide such a homogeneous nuclear reactor which does not require the use of control rods or extensive recombination apparatus either exterior to or within the reactor vessel.

A still further object of the present invention is to provide a homogeneous nuclear reactor wherein no mechanical fuel circulating apparatus is utilized and in which the liquid fuel is a solution of uranium phosphate and phosphoric acid in water.

A still further object of the present invention is to provide a method without movable mechanical apparatus for removing the liquid fuel automatically from the reactor vessel when safe internal pressures are exceeded.

Other objects and advantages of the present invention will become more apparent from the following description including the drawings, hereby made a part of this specification, wherein.

SUMMARY OF REACTOR SPECIFICATIONS OF PREFERRED EMBODIMENT

| | |
|---|---|
| Type | Homogeneous. |
| Neutron energy | Thermal. |
| Power | 1 megawatt. |
| Fuel | $UO_2$ (enriched $U^{235}$) dissolved in $H_3PO_4$, operated with 200 p.s.i. hydrogen overpressure. |
| Moderator | Water. $H_3PO_4$. |
| Reflector | Graphite. |
| Solution: | |
| Composition | 0.3 M $UO_2$ in 17.5 M (95%) $H_3PO_4$. |
| Operating volume | 97.4 liters. |
| Cold volume | 82.5 liters. |
| Power density | 16 kw./liter. |
| Operating temperature | 430° C. |
| Operating pressure | Less than 1400 p.s.i. |
| Gas evolution | Equal to recombination by back reaction. |
| Density (25° C.) | 1.85 g./cc. |
| Reactor vessel: | |
| Over-all volume | 104.7 liters. |
| Vapor region volume | 7.3 liters. |
| Critical region volume | 62.6 liters. |
| Height of critical region | 24″. |
| Diameter of critical region | 14¾″. |
| Vessel pressure limit | 1400 p.s.i. |
| Heat exchanger: | |
| Area | 30.6 ft.² |
| Composition | 44 spiral coils, 21 ft. long, ³⁄₁₆″ O.D. x ⅛″ I.D., clad with .006″ gold. |
| Coolant | Water. |
| Coolant flow rate | 4.36 gal. per minute. |
| Coolant temperature | 128° F. inlet, 600° F. outlet. |
| Coolant pressure | 600 p.s.i. outlet. |
| Fuel solution circulation velocity | 1 ft. per sec. |
| Fuel burn-up compensation | Movable graphite sleeve around reactor vessel, or burnable poison. |
| Safety | Excess pressure returns fuel to non-critical reservoir. |
| Flux in critical region: | |
| Fast neutrons | $2.5 \times 10^{13}$ n/cm.²/sec., average. |
| Thermal neutrons | $0.48 \times 10^{13}$ n/cm.²/sec., average. |

APPARATUS

Figure 1:
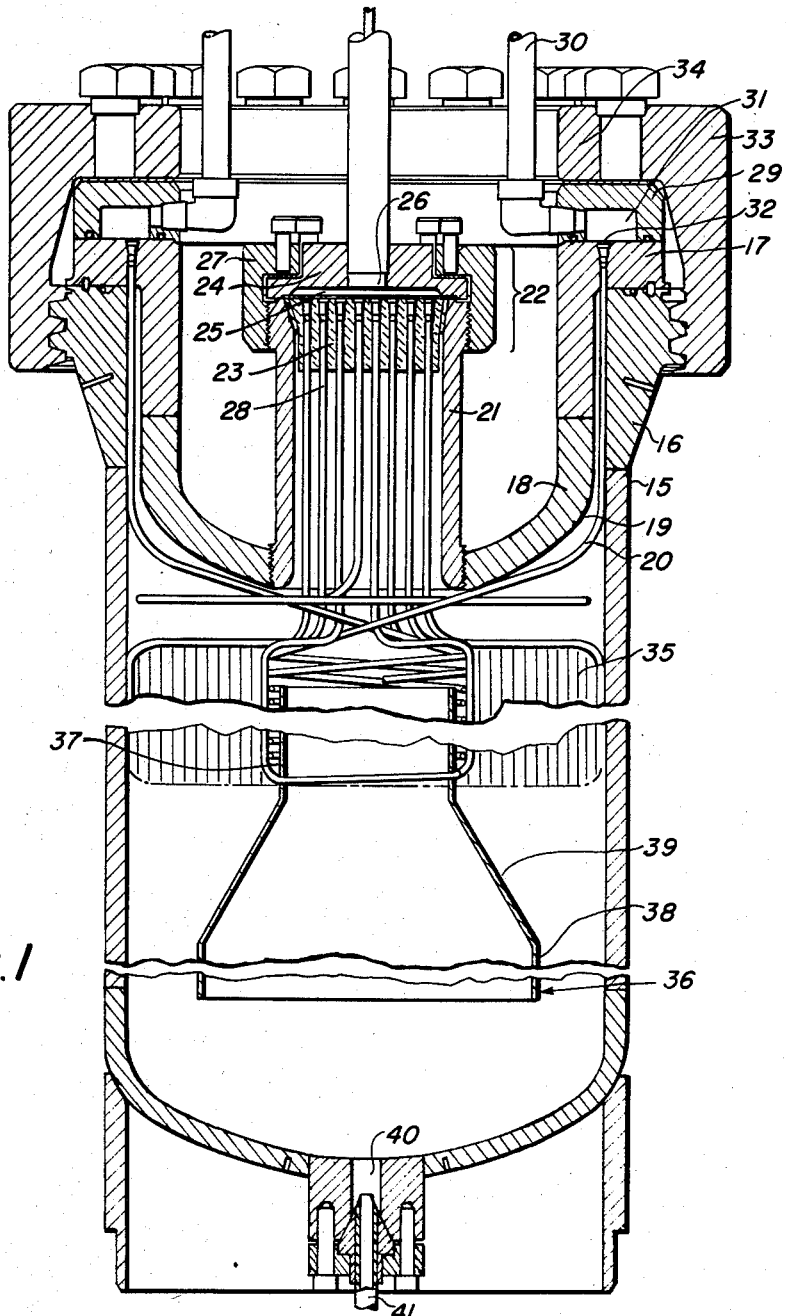
Figure 1 is a sectional view of the preferred embodiment of the present invention showing the internal components thereon.

The preferred embodiment of the present invention shown in Figure 1 comprises a test tube shaped reactor vessel 15, preferably fabricated from stainless steel, clad with 0.015″ gold, and having a threaded top flange 16. Sealed to the top surface of the flange 16, by means of an O ring or similar device, is a steam outlet manifold plate 17. The plate 17 has a portion 18 which extends into the reactor vessel 15 so as to provide a channel 19 through which extend steam outlet pipes 20. Extending upwardly from the lower portion 18 is a header attachment sleeve 21. The header attachment sleeve 21 has sealed to its top a coolant inlet manifold assembly 22. The inlet manifold assembly 22 includes an inlet pipe suspending block 23, a manifold top plate 24 having a chamber 25, and an inlet channel 26. A cover plate 27 is provided which engages threads on the periphery of the top of the header attachment sleeve 21 and which, through bolts and gaskets or similar means, seals the top plate 24 to the upper surface of header attachment sleeve 21. In this manner inlet pipes 28, which extend from the heat exchanging apparatus 35, and which are sealed in the block 23, are connected to chamber 25 and inlet channel 26. The inlet channel 26 is connected by conventional means to the coolant supply system, not shown.

Sealed to the upper surface of the outlet manifold plate 17 is an outlet manifold channel member 29 having a plurality of outlet connections 30 and forming a circular channel 31, adjacent terminal point 32 of pipes 20. The terminal points 32 are welded or otherwise sealed to the outlet manifold plate 17.

A top plate 33, with a threaded portion which engages the threaded portion of the flange 16, has a cover 34 extending over the channel member 29. Bolts in cover 34 function to seal the channel member 29, manifold plate 17 and the upper surface of flange 16 together by means of O rings or similar devices.

The outlet pipes 20 and inlet pipes 28 support heat exchanger 35. The heat exchanger 35 consists of 44 spiral coils, vertically stacked, each coil consisting of 21 feet of $\frac{3}{16}''$ O.D. by $\frac{1}{8}''$ I.D. stainless steel precious metal clad tubing. The heat exchanger is located in spaced relation to the bottom portion 18 of plate 17. Attached to and supported by the heat exchanger 35 is a flow directing baffle of platinum indicated generally as 36 with a narrow neck portion 37 and a larger diameter bottom portion 38 connected by a sloping portion 39. The bottom of the baffle 36 is located about 6 inches from the bottom of the vessel for a vessel diameter of about 15 inches. The spacing, however, will depend upon the size of the reactor, the desired flow rate and the diameter of the bottom portion 38 of baffle 36.

At the bottom of the vessel 15 an opening 40 is provided. Sealed to the walls of opening 40 is a liquid fuel transfer line 41.

Figure 2:
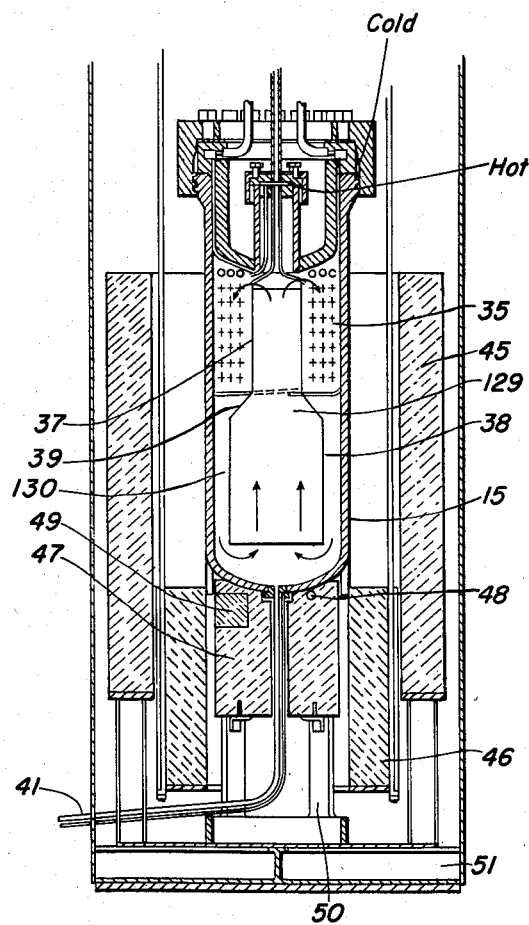
Figure 2 is a schematic view of the preferred embodiment of the present invention showing the circulation of the liquid fuel and the reflector arrangement.

Referring now to Figure 2, the reactor vessel 15 is surrounded by a graphite or other reflector 45 which is located in spaced relation to the vessel 15. Between the reflector 45 and the vessel 15, a movable cylindrical reflector 46 may be provided for fuel burn-up compensation. Cylindrical reflector 46 is vertically movable by hand or automatic means, and provides additional reflective material which can be moved to a position surrounding the critical region after the reactor has been in operation for some time to compensate for burn-up. However, such a movable reflector would not be required if, for example, burnable poison was used to compensate for reactivity changes over a period of time. Additional neutron reflecting material 47 is located immediately below the reactor vessel 15 and surrounds the liquid fuel transfer line 41. Located within the reflecting material 47 is a polonium-beryllium neutron source 48 which is used during initial start-up operations. A beryllium oxide block 49 is also located in the reflecting material 47. The block 49 becomes the primary background neutron source during subsequent start-ups.

The reactor vessel 15 is supported by a support 50 which is attached to a base 51. The base 51 also supports the reflector 45. The shielding construction and design are not described herein, since such construction and design are well known in the art.

LIQUID FUEL SYSTEMS

Any liquid fissionable fuel having the following required characteristics is suitable for use with the reactor of the present invention:

(1) The fuel vapor pressure increases substantially with increasing temperature in the operating temperature range;

(2) The fuel solution is chemically and radiolytically stable at operating temperatures;

(3) The fuel viscosity is sufficiently low to permit convection circulation at operating temperatures; and, (4) The fuel density substantially decreases as the fuel is heated.

The liquid fuel utilized in the preferred embodiment of the reactor of the present invention is a solution of enriched uranium phosphate, phosphoric acid and water, such as the 0.3 M $UO_2$ in 17.5 M (95%) $H_3PO_4$ solution illustrated in the above Summary of Reactor Specifications. This form requires the use of corrosion resistant cladding such as platinum, gold, or silver on all parts exposed to the solution at operating temperatures. The uranium is preferably enriched in the isotope $U^{235}$ to a value of about 90 percent. This and other suitable fuel systems are described in more detail, and the parameter limits specified in co-pending application Ser. No. 589,835, filed June 6, 1956, entitled "Nuclear Reactor Fuel Systems," now Patent No. 2,904,488, issued September 15, 1959, the disclosure of which is incorporated herein by reference.

CRITICAL REGION

The critical region of the reactor of the present invention is defined as that region within the lower portion of vessel 15 which extends downwardly from the bottom of the heat exchanger 35 to the bottom of the vessel 15, and is that region of the reactor vessel in which occurs the maximum concentration of neutron flux. The critical region, to a close approximation, is a right circular cylinder having a $14\frac{3}{4}''$ diameter and a $24''$ height. In the region located immediately above the critical region is the heat exchanger, the critical region and the heat exchanger region when filled with suitable nuclear fuel forming a critical assembly under normal operating conditions. Thus, under normal reactor operation, the liquid fuel level is near the top of heat exchanger 35. The region between the top of heat exchanger 35 and manifold plate 17 and extending up into header attachment sleeve 21 is defined as the vapor region and is filled with vapor and a cover gas to be used as an overpressure to prevent boiling of the fuel and to assure valence stability.

The necessary conditions for criticality may be calculated by methods well known in the art with consideration being given to the particular factors described above in the section, Liquid Fuel Systems. In any case, the term "Critital Cegion" necessarily implies a uranium-moderator concentration in a critical geometry sufficient to sustain a fission chain reaction.

LIQUID FUEL HANDLING SYSTEM

Figure 3:
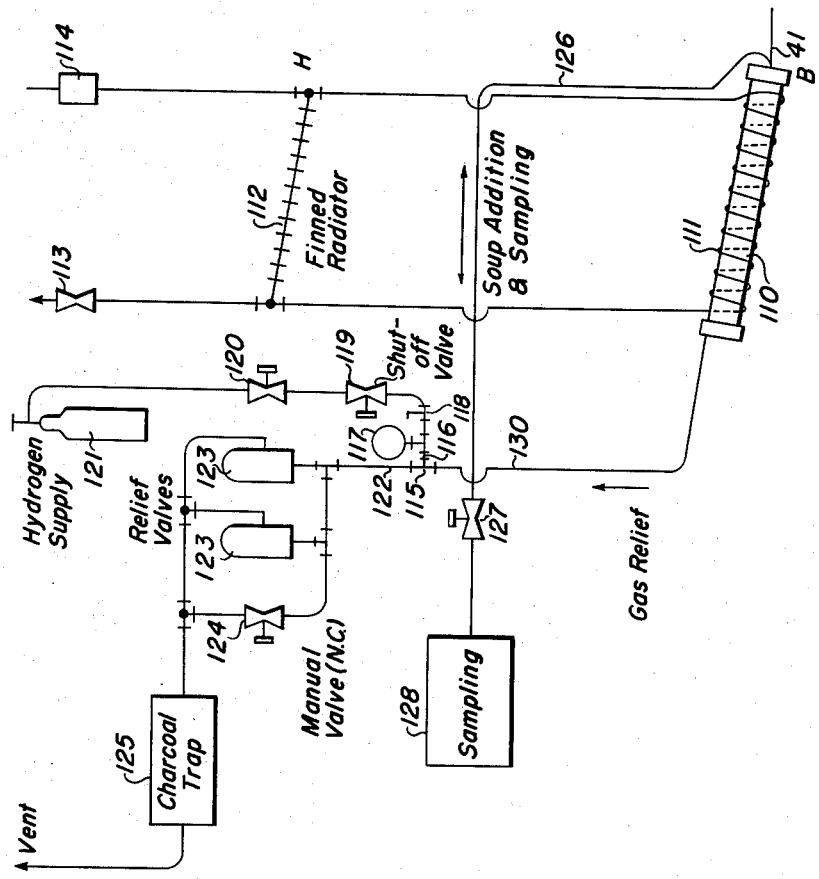
Figure 3 is a schematic diagram of the liquid fuel handling system.

The liquid fuel handling facilities are shown schematically in Figure 3. The liquid fuel transfer line 41, which is connected to the bottom of the reactor vessel 15, see Figure 2, is connected to a non-critical geometry reservoir 110. The reservoir 110 is surrounded by a cooling coil 111 which operates on a convection circulating principle through a cooling radiator 112 and is provided to cool the liquid fuel removed from the reactor vessel during shut-down operations. A vent 113 and coolant supply 114 are also provided for the coil 111.

The end of the reservoir 110 opposite to the liquid fuel transfer line 41 is connected to two branch systems at juncture 115. The first branch 116 extends through a pressure gauge 117, a flow limiting orifice 118, a shut-off valve 119, a reducing valve 120, and terminates at a gas supply 121, hydrogen being used in the preferred embodiment.

The second branch 122 extends through relief valves 123, which is by-passed by a manual valve 124, through a charcoal trap 125, and is then vented to the atmosphere.

A sampling tube 126 is connected to the reservoir 110 at the end adjacent liquid fuel transfer line 41, and extends through a valve 127 to conventional sampling apparatus 128.

The operation of the above-described components will become apparent from the hereinafter described operation of the reactor.

LIQUID FUEL CIRCULATION

The liquid fuels utilized in the reactor of the present invention are circulated through the heat exchanger by convection current. Figure 2 shows the general convection cycle. The liquid fuel within the critical region, i.e., the region below the heat exchanger 35, is heated by nuclear fissions. The hot liquid rises up channel 129 formed by the baffle bottom 38 and passes up into that portion of channel 129 formed by the baffle neck 37. The hot liquid fuel passes over the top of baffle neck 37 and into the spaces between the coils of heat exchanger 35. The fuel then passes down between the coils of heat exchanger 35 into passage 130 which extends between the sides of baffle bottom 38 and the walls of reactor vessel 15. The passage 130 has a total cross-sectional area approximately equal to the cross-section area of the passage defined by baffle neck 37. As the liquid fuel passes into passage 130, it is within the critical region and is subjected to a high neutron flux which causes fission in the $U^{235}$, thereby starting the process of heating the fuel as it passes down passage 130. The liquid fuel then passes around the bottom edge of baffle bottom 38 into the channel 129 where the fission and heating process is continued.

It is obvious that the column of liquid fuel in channel 129 is at a higher temperature, and therefore at a lower density, than the column of liquid fuel between the coils of heat exchanger 35 and passage 130. The difference in the density of the fuel in these two columns provides the convection flow. The liquid fuel in the preferred embodiment circulates at a velocity of about 1 ft./sec. at full power.

OPERATION

The initial start-up is carried out with movable reflector 46 raised to a position where it surrounds about two-thirds of the critical region. The reactor vessel 15 and fuel reservoir 110 are evacuated by any conventional means. Valves 124 and 127 are closed (see Fig. 3). The gas supply 121 is turned on by means of valve 119 and the gas pressure from supply 121 passes through limiting orifice 118 and line 130 into the reservoir 110, and through line 41 into reactor vessel 15. Valve 119 is closed when the initial pressure of gas in the reservoir-reactor system reaches that pressure calculated to give the correct overpressure when compressed by the fuel under operating conditions. (The calculation, readily performed by one skilled in the art, is based upon the fraction of the total volume of the reactor vessel which the fuel is to occupy under operating conditions, the operating temperature, and the solubility of the overpressure gas in the fuel.) Fuel is then injected under pressure into the system through valve 127 and line 126. The volume of fuel added is not critical, but must be of at least a sufficient quantity to fill the aforementioned predetermined fraction of the volume of the reactor vessel under operating conditions. Any excess fuel will remain in the reservoir during operation of the reactor. Valve 127 is then closed and additional gas is admitted from hydrogen supply 121, thereby increasing the pressure and forcing fuel into the reactor. The limiting orifice 118 limits introduction of solution into the reactor to a safe rate to prevent exceeding a reactivity change of 10 cents/sec. (One cent is one-hundredth of the dollar unit of reactivity which will make a reactor prompt critical.) When sufficient solution has been introduced into the reactor to reach the cold critical volume, i.e., that volume of liquid fuel required for the solution to become critical and start to heat, the solution begins to heat up at such a rate that its negative temperature coefficient ($\sim -5.7 \times 10^{-4}/°$ C.) uses up the excess reactivity produced by the further addition of solution. The solution in the core will continue to heat and expand into the heat exchanger 35. When the liquid fuel has reached a level approximately equal to the upper heat exchanger coil, operating temperature will then be reached, i.e., 430° C. At this condition, the vapor pressure of the fuel and the pressure due to compression of the cover gas produces a total pressure which is the predetermined normal operating pressure of the reactor. The pressure in line 130 and reservoir 110 is equal to the total reactor pressure since the hydrostatic head and the vapor pressure of the cold fuel in the reservoir are negligible. When the predetermined operating pressure is indicated by gauge 117, valve 119 is closed.

The convection circulation is started by extracting heat from the liquid fuel. This extraction is accomplished by flowing coolant water through the heat exchanger 35 thereby creating a temperature gradient in the liquid fuel. The amount of heat extracted, i.e., the rate of water flow through the heat exchanger, will determine the rate of convection circulation. Specifically for a water flow rate of 4.36 gals./min., the liquid fuel will circulate at a velocity of approximately 1 ft./sec.

The polonium-beryllium source 48 is utilized merely to supply neutrons initially. The beryllium oxide block when irradiated with gamma rays will supply additional neutrons for the reaction. However, it should be noted that such devices are used to facilitate control of the reactor during start-up operation, but are not required.

The power level of the reactor is controlled by the amount of heat removed from the heat exchanger, i.e., the rate of water flow which may be varied. The water in the heat exchanger is preferably highly purified by an ion-exchange bed. The water is converted to steam within the heat exchanger. The steam output may be utilized in any conventional manner, i.e., heating, power production, etc.

No control rods are required for the reactor of the present invention. Changes in reactivity resulting from fuel burn-up may be compensated for by any conventional method, such as, (1) Adjustment in the position of a neutron reflector;
(2) Addition of fissionable material to the liquid fuel;
(3) Removal of moderator from the liquid fuel; and
(4) Utilization of a burnable poison.

It is within the purview of this invention to utilize any one or all of these methods to compensate for the fuel burn-up.

It should be noted that the adjustable neutron reflector 46 may also be used for changing the reactor operating temperature as well as compensating for fuel burn-up. Self-regulation of the reactor is achieved through utilization of the novel resilient pressurizing mechanism controlled by reducing valve 120 and relief valves 123. This mechanism provides two distinct functions: (1) automatic regulation of the volume of fuel in the reactor to maintain criticality upon variations in temperature and operating pressure, and (2) automatic shut-down of the reactor if the reactor operating pressure nears the predetermined vessel pressure limit.

As explained above, liquid fuel will flow from the reservoir tank 110 into reactor vessel 15 as long as the gas supply pressure is greater than the internal reactor pressure, the gas supply pressure having been preset at the normal reactor operating pressure. Upon reaching normal operating pressure, the correct amount of fuel will then be in the reactor vessel and, because of the pressure equilibrium, there will be no further fuel transfer from the reservoir tank to the reactor vessel. Also, this pressure equilibrium will prevent the fuel contained in the reactor from draining back into the reservoir tank. The direct communication of the reservoir tank with the reactor vessel, there being no valve in the fuel transfer line 41, results in resilient pressurization of the reservoir tank, thereby providing automatic regulation of the volume of fuel in the reactor. This is apparent since an increase in reactor internal pressure over the normal operating pressure results in a pressure differential from the gas contained in the reservoir tank, thereby causing fuel to drain from the reactor vessel back into the reservoir tank until pressure equilibrium is again established. Similarly, a drop in the internal pressure of the reactor below normal operating pressure will result in a pressure differential with the reservoir tank, thereby causing more fuel to be transferred from the reservoir tank to the reactor vessel until pressure equilibrium is again re-established. Since changes in fuel temperature result in changes in fuel density, thereby changing the reactor criticality, this self-regulating feature is also responsive to temperature as well as pressure variations. Because of this automatic self-regulating feature, there will normally be no interruption in the withdrawal of power from the reactor upon moderate variations in reactor temperatures and pressures, since the condition of criticality will be automatically restored.

If the reactor internal pressure exceeds a predetermined value, the relief valves 123 will allow gas present in the reservoir tank 110 to escape through the charcoal trap 125, thereby allowing the liquid fuel to flow out of the reactor vessel. The relief valves 123 are preset to allow the pressure within reservoir 110 to be vented to the atmosphere only if the internal reactor vessel pressure reaches a value close to the vessel pressure limit. Thus, under moderate pressure variations, the first named self-regulating feature of the reactor will continue to operate and the reactor will not be shut down. However, upon a large pressure build-up approaching the vessel pressure limit, the reactor will be automatically shut down through the operation of relief valves 123. Furthermore, should such a high pressure build-up in the reactor continue after all of the fuel has been drained from the reactor vessel back into the reservoir tank, the fuel itself will be vented to the atmosphere, charcoal trap 125 functioning to prevent an undesirable increase in atmosphere radioactvity. Manual shut-down of the reactor is accomplished by opening valve 124 to relieve the pressure holding the liquid fuel in the reactor.

Samples of the liquid fuel may be obtained by opening valve 127 and collecting a portion of the liquid fuel in the conventional sampling apparatus 128.

Thus it is apparent that the preferred embodiment of the present invention provides a simple, compact nuclear reactor which doesn ot require constant attendance, since there are no moving parts within the reactor vessel, no control rods are required, and the reactor is self-regulating. Further, the present invention provides a novel arrangement and association of parts which results in nuclear reaction which can be used at remote locations. While the presently preferred embodiment of the present invention has been described, it is clear that many modifications may be made without departing from the scope of the invention. Therefore the present invention is not limited by the foregoing description, but solely by the appended claims.

What is claimed is:

1. A homogeneous nuclear reactor comprising a sealed reactor vessel having an upper portion, a middle portion and a lower portion, the upper end of said upper portion terminating in a removable manifold plate, heat exchanger means supported in said middle portion, said vessel containing a quantity of liquid fuel which during normal reactor operation at a predetermined operating temperature and pressure is sufficient to fill the lower portion of said vessel and to substantially fill the middle portion of said vessel thereby substantially covering said heat exchanger means and providing a lower boundary surface to define a vapor region extending between the level of said liquid fuel and said manifold plate in said upper portion of said vessel, said vapor region containing a cover gas at a predetermined operating overpressure, said fuel comprising an aqueous solution containing a sufficient concentration of a fissionable isotope to constitute a critical assembly when substantially filling the lower and middle portions of said vessel at said operating temperature, said fuel having a density which decreases with increases in fuel temperature above said operating temperature, said fuel having a viscosity sufficiently low to permit convection circulation at said operating temperature, said fuel being chemically and radiolytically stable at said operating temperature, said fuel having a vapor pressure which increases with increases in fuel temperature above said operating temperature, means supported in said lower and middle portions of said vessel for directing convection circulation of said liquid fuel through the lower portion of said vessel and around said heat exchanger means in the middle portion of said vessel, a fuel reservoir tank located externally of said reactor vessel, a fuel transfer line connecting said reservoir tank with the bottom of said reactor vessel, means for pressurizing said reservoir tank at said predetermined reactor operating pressure whereby under operating conditions the volume of fuel in the reactor vessel will be varied in response to deviations in reactor pressure from said predetermined operating pressure, and means for relieving the pressure in said reservoir tank when the reactor pressure reaches a predetermined upper limiting value.

2. A homogeneous nuclear reactor comprising a sealed reactor vessel having an upper portion, a middle portion and a lower portion, the upper end of said upper portion terminating in a removable manifold plate, heat exchanger means supported in said middle portion, said vessel containing a quantity of liquid fuel which during normal reactor operation at a predetermined operating temperature and pressure is sufficient to fill the lower portion of said vessel and to substantially fill the middle portion of said vessel thereby substantially covering said heat exchanger means and providing a lower boundary surface to define a vapor region extending between the level of said liquid fuel and said manifold plate in said upper portion of said vessel, said vapor region containing a cover gas at a predetermined operating overpressure, said fuel comprising an aqueous solution containing a sufficient concentration of a fissionable isotope to constitute a critical assembly when substantially filling the lower and middle portions of said vessel at said operating temperature, said fuel having a density which decreases with increases in fuel temperature above said operating temperature, said fuel having a viscosity sufficiently low to permit convection circulation at said operating temperature, said fuel being chemically and radiolytically stable at said operating temperature, said fuel having a vapor pressure which increases with increases in fuel temperature above said operating temperature, means supported in said lower and middle portions of said vessel for directing convection circulation of said liquid fuel through the lower portion of said vessel and around said heat exchanger means in the middle portion of said vessel, a fuel reservoir tank located externally of said reactor vessel, a fuel transfer line connecting said reservoir tank with the bottom of said reactor vessel, means for pressurizing said reservoir tank at said predetermined reactor operating pressure whereby under operating conditions the volume of fuel in the reactor vessel will be varied in response to deviations in reactor pressure from said predetermined operating pressure, and a relief valve connected to said reservoir tank, said relief valve being adjusted to externally vent the pressure in said reservoir tank when the reactor pressure reaches a predetermined upper limiting valve.

References Cited in the file of this patent

UNITED STATES PATENTS

| | | |
|---|---|---|
| 2,820,753 | Miller et al. | Jan. 21, 1953 |
| 2,837,476 | Busey | June 3, 1958 |
| 2,843,543 | Christy | July 15, 1958 |
| 2,874,106 | Hammond et al. | Feb. 17, 1959 |

OTHER REFERENCES

CF-53-8-225, U.S. Atomic Energy Commission document dated August 1953. Available from Atomic Energy Commission Technical Information Service, Oak Ridge, Tenn. Pages 3, 7-20.

"Procedures of the International Conference on the Peaceful Uses of Atomic Energy." Held in Geneva August 8-20, 1955, vol. 3, United Nations, N.Y. (1955), pages 283-286. An article by Froman, Hammond and King.

U.S. Atomic Energy Commission LA-1942. By L. D. P. King. April 13, 1955. Los Alamos Scientific Lab. Obtainable from Technical Information Services, Oak Ridge, Tenn. Pages 2-17. Date declassified August 17, 1955.